US009163568B2

(12) United States Patent
Sczomak et al.

(10) Patent No.: US 9,163,568 B2
(45) Date of Patent: Oct. 20, 2015

(54) COLD START SYSTEMS AND METHODS (75) Inventors: David P. Sczomak, Troy, MI (US);
David J. Cleary, Shanghai (CN);
Junseok Chang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1356 days.

(21) Appl. No.: 12/582,304

(22) Filed: Oct. 20, 2009

(65) Prior Publication Data
US 2011/0088661 A1 Apr. 21, 2011

(51) Int. Cl.
| G06F 7/00 | (2006.01) |
| G06F 17/00 | (2006.01) |
| F02D 13/06 | (2006.01) |
| F02D 41/30 | (2006.01) |
| F02D 41/00 | (2006.01) |
| F02D 41/06 | (2006.01) |
| F02N 19/00 | (2010.01) |
| F02P 5/15 | (2006.01) |
| F02D 41/40 | (2006.01) |
| F02D 13/02 | (2006.01) |

(52) U.S. Cl.
CPC ............ *F02D 13/06* (2013.01); *F02D 41/0087* (2013.01); *F02D 41/064* (2013.01); *F02D 41/3058* (2013.01); *F02N 19/004* (2013.01); *F02P 5/1506* (2013.01); *F02D 13/0219* (2013.01); *F02D 41/402* (2013.01); *F02D 2013/0292* (2013.01); *F02D 2041/001* (2013.01); *F02D 2041/0012* (2013.01); *F02D 2200/021* (2013.01); *F02D 2200/0414* (2013.01); *Y02T 10/18* (2013.01); *Y02T 10/44* (2013.01); *Y02T 10/46* (2013.01)

(58) Field of Classification Search
CPC . Y02T 10/44; F02D 2041/001; F02D 41/402; F02D 41/3058; F02D 41/064
USPC ........... 123/481, 90.15, 299, 406.76; 701/113
See application file for complete search history.

(56) References Cited

U.S. PATENT DOCUMENTS

| 1,882,971 | A | * | 10/1932 | Schimanek | ...................... 123/64 |
| 3,709,201 | A | * | 1/1973 | Cook | ............................... 123/64 |
| 4,641,613 | A | * | 2/1987 | Delesalle | ................. 123/179.21 |
| 6,269,632 | B1 | * | 8/2001 | Schmitz | .......................... 60/274 |
| 6,443,108 | B1 | * | 9/2002 | Brehob et al. | ................... 123/64 |
| 6,564,758 | B1 | * | 5/2003 | Enderle et al. | .................. 123/64 |
| 7,047,944 | B2 | * | 5/2006 | Toth | .............................. 123/491 |
| 7,073,487 | B1 | * | 7/2006 | Oono | ............................ 123/457 |
| 7,210,455 | B2 | * | 5/2007 | Visser et | ..................... 123/406.3 |
| 7,873,464 | B2 | * | 1/2011 | Shartzer et al. | ................ 701/113 |
| 7,900,594 | B2 | * | 3/2011 | Gwidt et al. | ..................... 123/299 |
| 8,078,392 | B2 | * | 12/2011 | Yahata et al. | .................. 701/123 |
| 8,812,215 | B2 | * | 8/2014 | Sugiyama et al. | ............ 701/104 |
| 2008/0060609 | A1 | * | 3/2008 | Surnilla et al. | ................ 123/299 |
| 2010/0228466 | A1 | * | 9/2010 | Ekchian et al. | ............... 701/113 |
| 2010/0294224 | A1 | * | 11/2010 | Svensson | ................. 123/179.16 |
| 2011/0067665 | A1 | * | 3/2011 | Beckmann et al. | ...... 123/179.21 |

\* cited by examiner

*Primary Examiner* — Mahmoud Gimie
*Assistant Examiner* — David Hamaoui (57) ABSTRACT A cylinder deactivation system comprises a fuel injection module and a cold start control module. The fuel injection module injects a desired amount of fuel into a cylinder of an engine during engine cranking. The cold start control module maintains an intake valve and an exhaust valve associated with the cylinder in respective closed positions while the desired amount of fuel is injected when at least one of an air temperature and a coolant temperature is less than a predetermined cold start temperature.

13 Claims, 4 Drawing Sheets

COLD START SYSTEMS AND METHODS

FIELD

The present disclosure relates to internal combustion engines and more particularly to selective cylinder deactivation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts an air/fuel mixture to generate drive torque for a vehicle. The air is drawn into the engine through a throttle valve and an intake manifold. The fuel is provided by one or more fuel injectors. The air/fuel mixture is combusted within one or more cylinders of the engine. Combustion of the air/fuel mixture may be initiated by, for example, injection of the fuel and/or spark provided by a spark plug. Combustion of the air/fuel mixture produces exhaust gas. The exhaust gas is expelled from the cylinders to an exhaust system.

An engine control module (ECM) controls the torque output of the engine. For example only, the ECM controls the torque output of the engine based on driver inputs and/or other inputs. The driver inputs may include, for example, an accelerator pedal position, a brake pedal position, inputs to a cruise control system, and/or other driver inputs. The other inputs may include inputs from various vehicle systems, such as a transmission control system.

SUMMARY

A cylinder deactivation system comprises a fuel injection module and a cold start control module. The fuel injection module injects a desired amount of fuel into a cylinder of an engine during engine cranking. The cold start control module maintains an intake valve and an exhaust valve associated with the cylinder in respective closed positions while the desired amount of fuel is injected when at least one of an air temperature and a coolant temperature is less than a predetermined cold start temperature.

In other features, the predetermined cold start temperature is less than zero degrees Celsius.

In still other features, the cylinder deactivation system further comprises a fuel determination module. The fuel determination module determines the desired amount of fuel based on the air temperature.

In further features, the fuel determination module determines the desired amount of fuel further based on a type of the fuel.

In still further features, the cold start control module separates the injection of the desired amount of fuel into at least two separate fuel injection events.

In other features, the cold start control module maintains intake and exhaust valves associated with other cylinders of the engine in closed positions, respectively, while desired amounts of fuel are injected into the other cylinders, respectively.

In still other features, the cold start control module disables opening of the intake and exhaust valves for at least two crankshaft revolutions while the desired amount of fuel is injected.

In further features, the cold start control module disables provision of spark to the cylinder for at least two crankshaft revolutions.

A cylinder deactivation system comprises a fuel injection module and a cold start control module. The fuel injection module injects a desired amount of fuel into a cylinder of an engine during engine cranking. The cold start control module maintains an intake valve and an exhaust valve associated with the cylinder in respective closed positions while the desired amount of fuel is injected when the desired amount of fuel is greater than a predetermined maximum amount of fuel that is injectable during one cylinder cycle.

In other features, the cylinder deactivation system further comprises a fuel determination module. The fuel determination module determines the desired amount of fuel based on an air temperature and a type of the fuel.

In still other features, the cold start control module separates the injection of the desired amount of fuel into at least two separate fuel injection events.

In further features, the cold start control module maintains intake and exhaust valves associated with other cylinders of the engine in closed positions, respectively, while desired amounts of fuel are injected into the other cylinders, respectively.

In still further features, the cold start control module disables opening of the intake and exhaust valves for at least two crankshaft revolutions while the desired amount of fuel is injected.

In other features, the cold start control module disables provision of spark to the cylinder for at least two crankshaft revolutions.

A cylinder deactivation method comprises: injecting a desired amount of fuel into a cylinder of an engine during engine cranking; and maintaining an intake valve and an exhaust valve associated with the cylinder in respective closed positions while the desired amount of fuel is injected when at least one of an air temperature and a coolant temperature is less than a predetermined cold start temperature.

In other features, the predetermined cold start temperature is less than zero degrees Celsius.

In still other features, the cylinder deactivation method further comprises separating the injecting the desired amount of fuel into at least two separate fuel injection events.

In further features, the cylinder deactivation method further comprises maintaining intake and exhaust valves associated with other cylinders of the engine in closed positions, respectively, while desired amounts of fuel are injected into the other cylinders, respectively.

In still further features, the cylinder deactivation method further comprises disabling opening of the intake and exhaust valves for at least two crankshaft revolutions while the desired amount of fuel is injected.

In other features, the cylinder deactivation method further comprises disabling provision of spark to the cylinder for at least two crankshaft revolutions.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Upon engine startup, a starter engages and drives rotation of a crankshaft of an engine. An engine control module (ECM) provides a desired amount of fuel to a cylinder of the engine during engine cranking and combusts the fuel to begin normal engine operation. When the temperature is low during engine cranking, the desired amount of fuel necessary for proper combustion may exceed the amount of fuel that an engine driven fuel pump is capable of providing.

The ECM of the present disclosure determines the desired amount of fuel based on the air temperature. The ECM deactivates opening of intake and exhaust valves associated with the cylinder during a combustion cycle of the cylinder while the desired amount of fuel is injected. In other words, the ECM maintains the intake and exhaust valves in respective closed positions while the desired amount of fuel is injected. The ECM may also deactivate the other cylinders of the engine while desired amounts of fuel are injected into the other cylinders, respectively.

Figure 1:
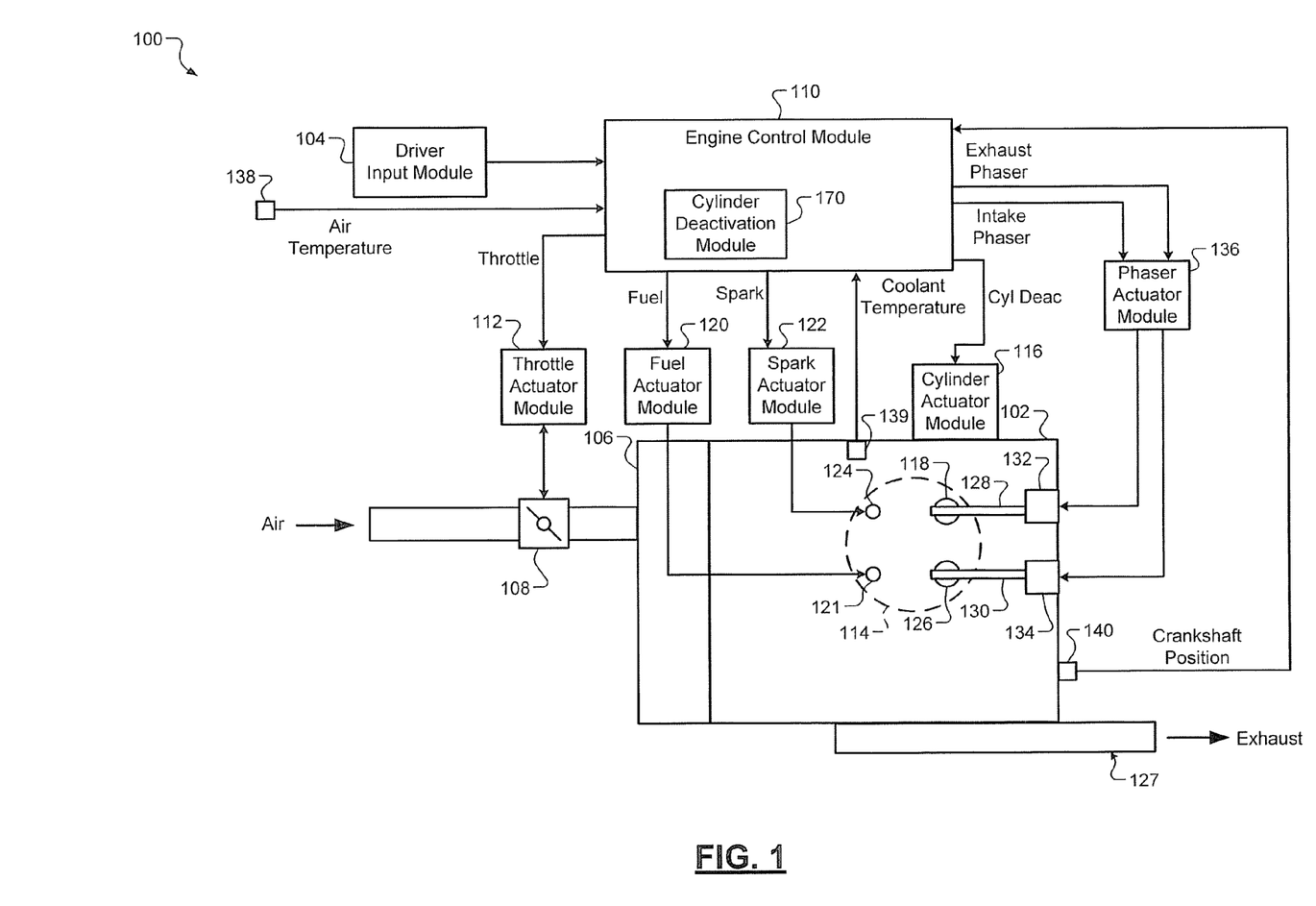
FIG. 1 is a functional block diagram of an exemplary engine system according to the principles of the present disclosure.

Referring now to FIG. 1, a functional block diagram of an exemplary engine system 100 is presented. The engine system 100 includes an engine 102 that combusts an air/fuel mixture to produce drive torque for a vehicle based on driver inputs and other inputs. The driver inputs are provided by a driver input module 104. Air is drawn into an intake manifold 106 through a throttle valve 108. For example only, the throttle valve 108 may include a butterfly valve having a rotatable blade. An engine control module (ECM) 110 controls a throttle actuator module 112, which regulates opening of the throttle valve 108 to control the amount of air drawn into the intake manifold 106.

Air from the intake manifold 106 is drawn into cylinders of the engine 102. While the engine 102 may include multiple cylinders, for illustration purposes a single representative cylinder 114 is shown. For example only, the engine 102 may include 2, 3, 4, 5, 6, 8, 10, and/or 12 cylinders. The ECM 110 may instruct a cylinder actuator module 116 to selectively deactivate some of the cylinders, which may improve fuel economy under certain engine operating conditions.

Air from the intake manifold 106 is drawn into the cylinder 114 through an intake valve 118. The ECM 110 controls a fuel actuator module 120, which regulates the amount of fuel injected by a fuel injector 121 to achieve a desired air/fuel ratio. Fuel may be injected directly into the cylinders or into mixing chambers within the cylinders. The fuel actuator module 120 may halt injection of fuel to cylinders that are deactivated during normal engine operation to minimize fuel consumption. Fuel is provided to the fuel injector 121 by a low pressure fuel pump and a high pressure fuel pump (not shown). The low pressure fuel pump draws fuel from a fuel tank and provides fuel at low pressures to the high pressure fuel pump. The high pressure fuel pump selectively further pressurizes the fuel, for example, for direct injection into the cylinders.

The injected fuel mixes with air and creates an air/fuel mixture in the cylinder 114. A piston (not shown) within the cylinder 114 compresses the air/fuel mixture. Based upon a signal from the ECM 110, a spark actuator module 122 energizes a spark plug 124 in the cylinder 114, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 126. The byproducts of combustion are exhausted from the vehicle via an exhaust system 127.

The spark actuator module 122 may be controlled by a timing signal provided by the ECM 110 indicating how far before or after TDC the spark should be provided. Operation of the spark actuator module 122 may therefore be synchronized with crankshaft rotation. In various implementations, the spark actuator module 122 may halt provision of spark to deactivated cylinders.

One combustion cycle, from the standpoint of one of the cylinders, involves two revolutions of the crankshaft (i.e., 720° of crankshaft rotation). One combustion cycle for one cylinder can be described in terms of four phases: an intake phase; a compression phase; an expansion phase; and an exhaust phase. For example only, the piston lowers toward the BDC position and air is drawn into the cylinder 114 during the intake phase. The piston rises toward the TDC position and compresses the contents of the cylinder 114 during the compression phase. Fuel is supplied into the cylinder 114 and is combusted near an end of the combustion phase through a beginning of the expansion phase. The combustion drives the piston toward the BDC position during the expansion phase. The piston rises toward the TDC to expel the resulting exhaust gas from the cylinder 114 during the exhaust phase.

The intake valve 118 may be controlled by an intake camshaft 128, while the exhaust valve 126 may be controlled by an exhaust camshaft 130. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The cylinder actuator module 116 selectively deactivates the cylinder 114 by disabling opening of the intake valve 118 and the exhaust valve 126. In other words, the cylinder actuator module 116 selectively deactivates the cylinder 114 by maintaining the intake and exhaust valves 118 and 126 in closed positions at times when the intake and/or exhaust valves 118 and 126 would otherwise open. For example only, the cylinder actuator module 116 may disable opening of the intake and exhaust valves 118 and 126 by collapsing a hydraulic lash adjuster (also referred to as a lifter assembly) or in another suitable manner.

The time at which the intake valve 118 is opened may be varied with respect to the TDC position by an intake cam phaser 132. The time at which the exhaust valve 126 is opened may be varied with respect to the TDC position by an exhaust cam phaser 134. A phaser actuator module 136 controls the intake cam phaser 132 and the exhaust cam phaser 134 based on signals from the ECM 110. When implemented, variable valve lift may also be controlled by the phaser actuator module 136.

The engine system 100 may include a boost device (not shown) that provides pressurized air to the intake manifold 106. For example, the engine system 100 may include one or more turbochargers and/or a supercharger. The engine system 100 may also include an exhaust gas recirculation (EGR) valve (not shown), which selectively redirects exhaust gas back to the intake manifold 106.

The ECM 110 may use signals from sensors to make control decisions for the engine system 100. For example only, an air temperature sensor 138 measures air temperature and outputs an air temperature signal accordingly. For example only, the air temperature sensor 138 may measure air temperature based on intake air temperature (IAT) and/or ambient air temperature. An engine coolant temperature sensor 139 measures temperature of engine coolant and outputs a coolant temperature signal accordingly. Other sensors may include a mass airflow (MAF) sensor, a manifold absolute pressure (MAP) sensor, and other suitable sensors.

The ECM 110 also receives a crankshaft position signal from a crankshaft sensor 140. The crankshaft sensor 140 measures the position of the crankshaft and outputs the crankshaft position signal accordingly. For example only, the crankshaft sensor 140 may include a variable reluctance (VR) sensor or another suitable type of crankshaft sensor.

The crankshaft position signal may include a pulse train. Each pulse of the pulse train may be generated as a tooth of an N-toothed wheel (not shown) that rotates with the crankshaft, passes the VR sensor. Accordingly, each pulse corresponds to an angular rotation of the crankshaft by an amount equal to 360° divided by N teeth. The N-toothed wheel may also include a gap of one or more missing teeth, and the gap may be used as an indicator of one complete revolution of the crankshaft (i.e., 360° of crankshaft rotation).

The ECM 110 may communicate with various vehicle modules. For example only, the ECM 110 may communicate with a transmission control module (not shown) to coordinate shifting gears in a transmission (not shown). For example, the ECM 110 may reduce engine torque during a gear shift. The ECM 110 may also communicate with a hybrid control module (not shown) to coordinate operation of the engine 102 and an electric motor or motor-generator (not shown).

Each system that varies an engine parameter may be referred to as an actuator. The engine parameter that is varied may be referred to as an actuator value. For example, the throttle actuator module 112 may be referred to as an actuator and the throttle opening area may be referred to as the actuator value.

Similarly, the spark actuator module 122 may be referred to as an actuator, while the corresponding actuator value may be the amount of spark advance relative to the TDC position. Other actuators may include, for example, the phaser actuator module 136, the fuel actuator module 120, and the cylinder actuator module 116. For these actuators, the actuator values may correspond to intake and exhaust cam phaser angles, amount (e.g., mass) of fuel injected, and number of cylinders deactivated, respectively. The ECM 110 may control the actuator values in order to achieve a desired torque from the engine 102.

During engine cranking, a starter (not shown) engages and drives rotation of the crankshaft. An engine cranking period begins when the starter is engaged and drives rotation of the crankshaft. The engine cranking period may extend to when, for example, the engine speed exceeds a predetermined speed (e.g., approximately 500 rpm) for a predetermined number of combustion events. The ECM 110 provides a desired amount of fuel to each cylinder of the engine 102 during engine cranking and combusts the fuel to begin normal engine operation.

When the temperature (e.g., air temperature and engine temperature) is low during engine cranking, however, the desired amount of fuel necessary for proper combustion increases. This increase in the desired amount of fuel may be attributable to limited ability of injected fuel to vaporize at low temperatures.

The desired amount of fuel necessary for proper combustion at low temperatures is also dependent upon the type of fuel being combusted. For example, a greater amount of E85 fuel (relative to gasoline) may be required to achieve proper combustion at low temperatures during engine cranking.

The ECM 110 of the present disclosure includes a cylinder deactivation module 170 that selectively deactivates the cylinders of the engine 102 during engine cranking. While the cylinder deactivation module 170 will be discussed as it relates to the deactivation of the single representative cylinder 114, the cylinder deactivation module 170 may control the other cylinders of the engine 102 similarly or identically.

The cylinder deactivation module 170 selectively maintains the intake and exhaust valves 118 and 126 of the cylinder 114 in respective fully closed positions until the desired amount of fuel is provided to the cylinder 114. The cylinder deactivation module 170 also delays initiation of combustion within the cylinder 114 until the desired amount of fuel has been injected into the cylinder 114. The cylinder deactivation module 170 may enable normal opening and closing of the intake and exhaust valves 118 and 126 after the desired amount of fuel has been provided.

Figure 2:
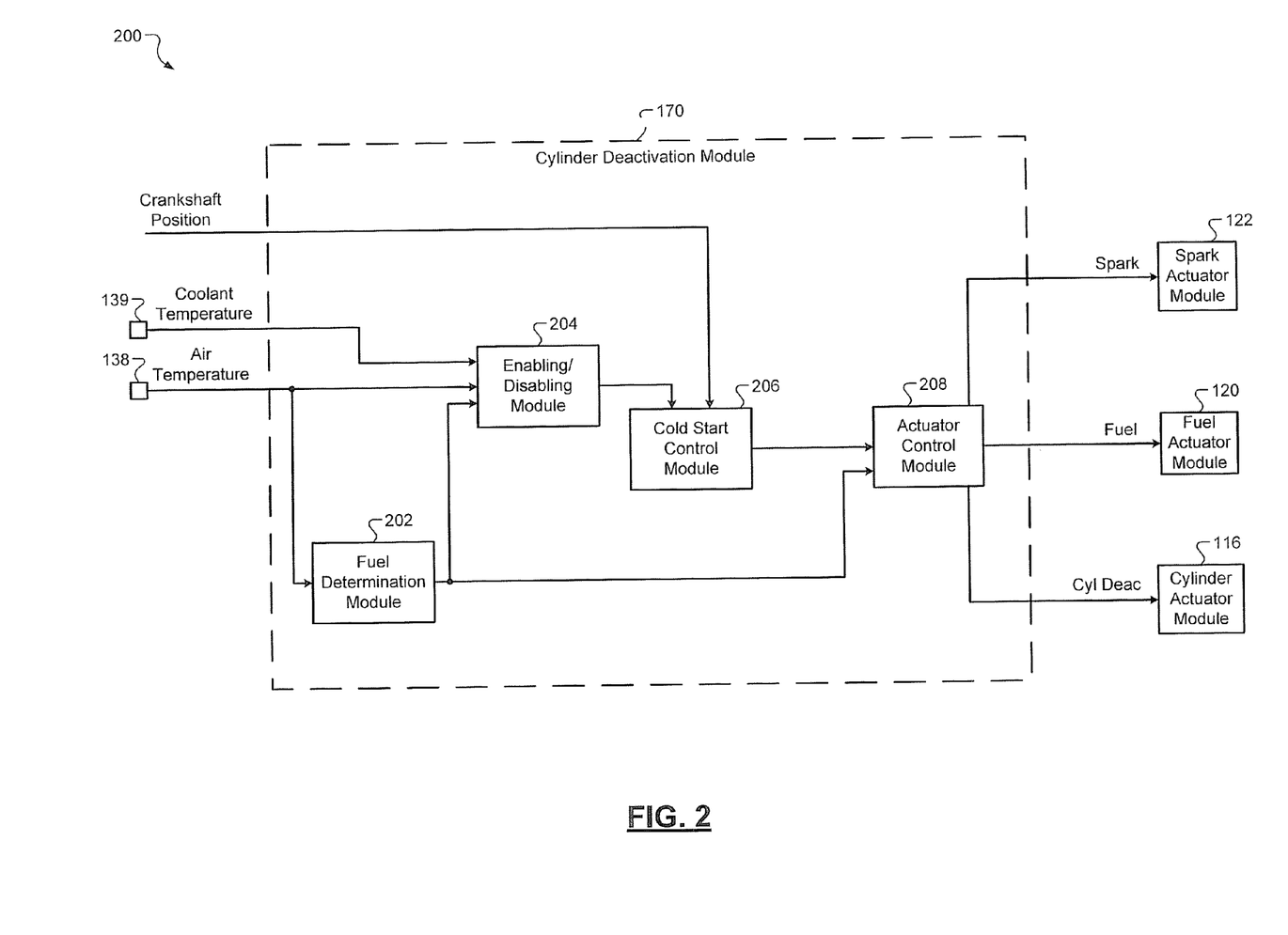
FIG. 2 is a functional block diagram of an exemplary implementation of a cylinder deactivation system according to the principles of the present disclosure.

Referring now to FIG. 2, a functional block diagram depicting an exemplary cylinder deactivation system 200 is presented. The cylinder deactivation module 170 includes a fuel determination module 202, an enabling/disabling module 204, a cold start control module 206, and an actuator control module 208.

The fuel determination module 202 determines the desired amount of fuel for combustion within the cylinder 114 during engine cranking. The desired amount of fuel for each of the other cylinders of the engine 102 may be the same or different than the desired amount of fuel for the cylinder 114.

The fuel determination module 202 determines the desired amount of fuel based on one or more temperatures. For example only, fuel determination module 202 may determine the desired amount of fuel based on the ambient air temperature, the intake air temperature, or another suitable measure of air temperature. Air temperature may be used to determine a mass of air trapped within the cylinder 114 (i.e., a trapped air mass) and the desired amount of fuel may be determined based on the trapped air mass. When the engine 102 has been shutdown (i.e., OFF) for at least a predetermined period, the fuel determination module 202 may also determine the desired amount of fuel based on the engine coolant temperature. For example only, the desired amount of fuel may increase as the temperature decreases.

The fuel determination module 202 may also determine the desired amount of fuel based on what type of fuel will be combusted. For example only, the fuel determination module 202 may determine the desired amount of fuel based on the ethanol content of the fuel, which may be determined and stored before the engine 102 was last shutdown. Methanol content or another suitable measure of the type of fuel may also be used. The fuel determination module 202 provides the desired amount of fuel to the actuator control module 208 for provision to the cylinder 114 during engine cranking.

The enabling/disabling module 204 selective enables and disables the cold start control module 206 based on the engine coolant temperature. More specifically, the enabling/disabling module 204 may enable the cold start control module 206 when the engine coolant temperature is less than a predetermined cold start temperature. For example only, the predetermined cold start temperature may be approximately −20.0° C. In some implementations, the enabling/disabling module 204 may additionally or alternatively ensure that the air temperature is less than the predetermined cold start temperature before enabling the cold start control module 206.

The enabling/disabling module 204 may also selectively enable and disable the cold start control module 206 based on whether the desired amount of fuel can be injected during one fuel injection event. In other words, the enabling/disabling module 204 may determine whether the desired amount of fuel can be injected during the intake and compression phases of the cylinder 114 (one crankshaft revolution). The enabling/disabling module 204 enables the cold start control module 206 when the desired amount of fuel cannot be injected during one fuel injection event. For example only, the enabling/disabling module 204 may enable the cold start control module 206 when the desired amount of fuel is greater than a predetermined amount. The predetermined amount may correspond to a maximum amount of fuel that a fuel pump is capable of supplying to the fuel injector 121 at sufficient pressure during the intake and compression phases of one engine cycle.

Written another way, the enabling/disabling module 204 disables the cold start control module 206 when the coolant temperature is greater than the predetermined cold start temperature or the desired fuel amount is less than the predetermined amount. The predetermined amount of fuel may be set based on a maximum amount of fuel deliverable to the cylinder 114 at sufficient pressure during one crankshaft revolution (i.e., 360° of crankshaft rotation).

When enabled, the cold start control module 206 commands deactivation of the cylinder 114 during engine cranking. For example, the cold start control module 206 commands deactivation of the intake and exhaust valves 118 and 126 of the cylinder 114 during engine cranking. In other words, the cold start control module 206 commands the actuator control module 208 to maintain the intake and exhaust valves 118 and 126 in the respective closed position during engine cranking. The cold start control module 206 may command deactivation of all of the cylinders of the engine 102.

The cold start control module 206, however, commands injection of the desired amount of fuel while the intake and exhaust valves 118 and 126 are maintained in the respective closed positions. The cold start control module 206 also delays combustion of the contents of the cylinder 114 until the desired amount of fuel has been injected into the cylinder 114. In other words, the cold start control module 206 disables the provision of spark to the cylinder 114 until the desired amount of fuel has been injected. The cold start control module 206 enables combustion of the contents of the cylinder 114 after the desired amount of fuel has been injected.

The cold start control module 206 may specify the period (e.g., the number of crankshaft revolutions) of cylinder deactivation based on the desired amount of fuel. For example only, the cold start control module 206 may increase the period of cylinder deactivation as the desired amount of fuel to be injected increases. In one implementation, the cold start control module 206 may limit the period of cylinder deactivation to two combustion cycles (i.e., four crankshaft revolutions or 1440° of crankshaft rotation).

The actuator control module 208 controls the engine actuators based on the commands from the cold start control module 206. More specifically, the actuator control module 208 provides signals to the cylinder actuator module 116, the fuel actuator module 120, and the spark actuator module 122 based on the commands of the cold start control module 206. The actuator control module 208 may enter normal control of the engine actuators after the engine cranking has ended or when the cold start control module 206 is disabled during engine cranking.

Figure 3:
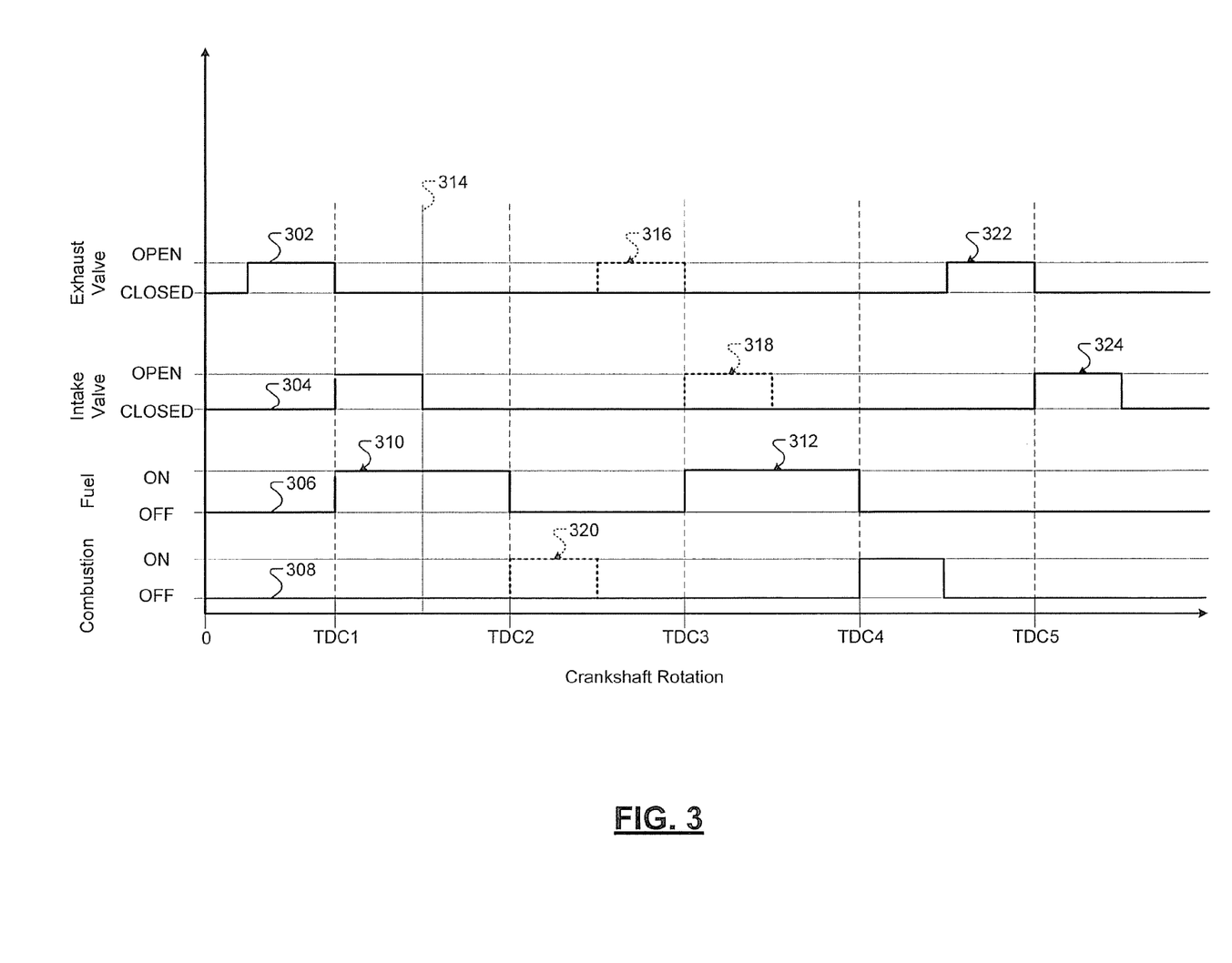
FIG. 3 is an exemplary graph depicting engine parameters as controlled by the cylinder deactivation system according to the present disclosure.

FIG. 3 is a graph depicting various engine parameters associated with the cylinder 114 as controlled by the cylinder deactivation system 200. Exemplary trace 302 tracks opening and closing of the exhaust valve 126. Exemplary trace 304 tracks opening and closing of the intake valve 118. Exemplary trace 306 tracks opening and closing of the fuel injector 121. Exemplary trace 308 tracks combustion initiated by spark from the spark plug 124.

Engine startup is initiated and engine cranking begins at time zero. The passing of time in FIG. 3 is measured in terms of rotation of the crankshaft. Exemplary times TDC1, TDC2, TDC3, TDC4, and TDC5 correspond to first, second, third, fourth, and fifth times that the piston within the cylinder 114 reaches the TDC position, respectively.

Upon the initiation of engine cranking or shortly after at time zero, the fuel determination module 202 determines the desired amount of fuel to be supplied to the cylinder 114. The enabling/disabling module 204 monitors the engine coolant temperature and the desired amount of fuel and selectively enables the cold start control module 206. The enabling/disabling module 204 may also monitor the air temperature and selectively enable the cold start control module 206 based on the air temperature.

The intake valve 118 is opened at approximately time TDC 1 as illustrated by the intake valve position trace 304. The cold start control module 206 also begins supplying of the desired amount of fuel to the cylinder 114 at approximately time TDC1. The cold start control module 206 may provide the desired amount of fuel to the cylinder 114 in two or more separate fuel injections. For example only, the cold start control module 206 provides the desired amount of fuel in first and second separate injections 310 and 312 in FIG. 3.

The cold start control module 206 may also specify the timing of injection of the fuel based on, for example, the crankshaft position. For example only, the cold start control module 206 provides the first injection 310 to the cylinder during the intake and compression phases of one combustion cycle of the cylinder 114. The cold start control module 206 may also continue the provision of fuel injection between the first and second injections 310 and 312 (e.g., based on the desired amount of fuel).

After the intake phase of the combustion cycle (i.e., approximately at time 314), the cold start control module 206 deactivates the cylinder 114. More specifically, the cold start control module 206 deactivates opening and closing of the intake and exhaust valves 118 and 126 and disables combustion of the contents of the cylinder 114.

Exemplary dashed traces 316 and 318 track opening of the exhaust and intake valves 126 and 118 during normal engine operation. Exemplary dashed trace 320 tracks exemplary combustion within the cylinder 114. The cold start control module 206 disables provision of spark to the cylinder 114 and maintains the intake and exhaust valves 118 and 126 in the respective closed positions until the desired amount of fuel is delivered to the cylinder 114.

Accordingly, the fuel provided to the cylinder 114 during the first injection 310 is trapped within the cylinder 114. The second injection 312 is injected into the cylinder 114 starting at approximately time TDC3 to supply the difference between the desired amount of fuel and the amount provided by the first injection 310. In other implementations, the desired amount of fuel may be provided to the cylinder 114 in more than two separate injections.

The cold start control module 206 initiates combustion of the desired amount of fuel at approximately exemplary time TDC4. In various implementations, the combustion may be initiated before or after the piston reaches the TDC position at time TDC4. The cold start control module 206 also enables opening and closing of the intake and exhaust valves 118 and 126 at approximately time TDC4. Accordingly, the exhaust valve 126 is opened to expel the byproducts of combustion from the cylinder 114 as shown at 322 and the intake valve 118 is opened to draw in fresh air as shown at 324.

Figure 4:
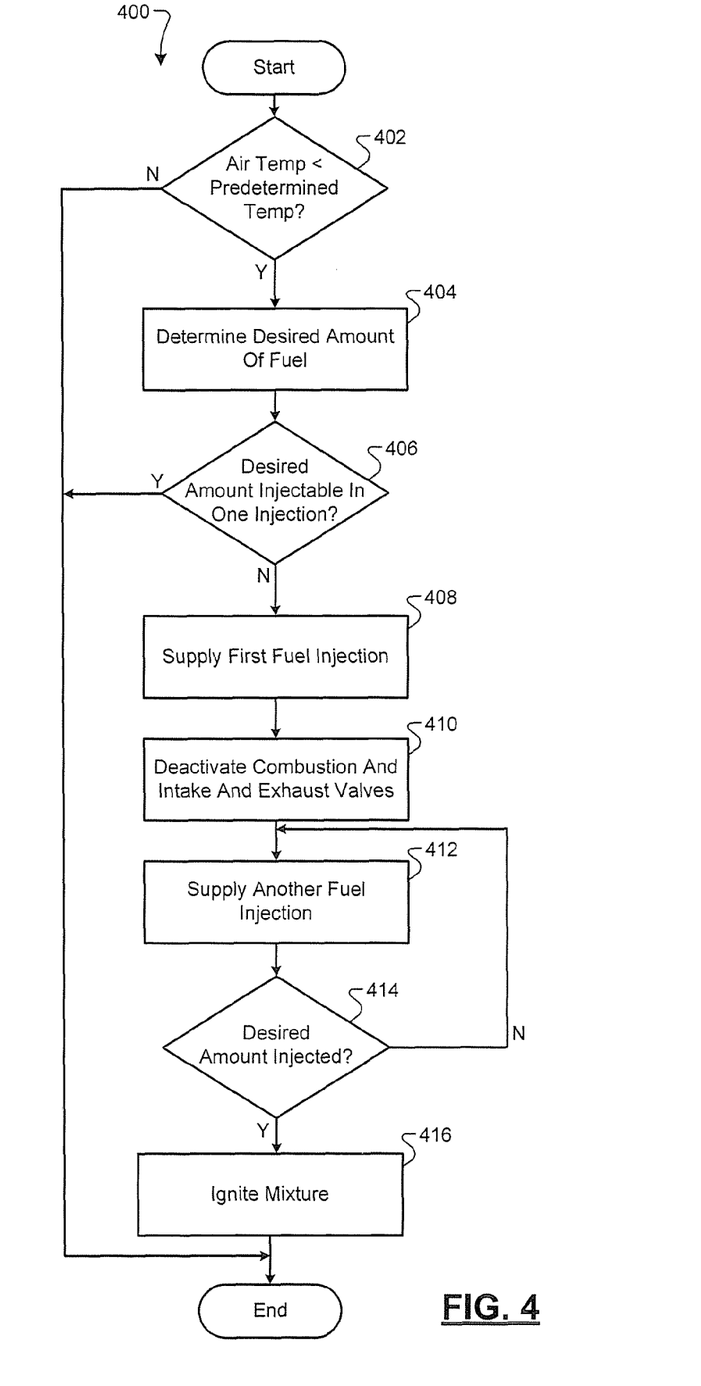
FIG. 4 is a flowchart depicting an exemplary method according to the principles of the present disclosure.

Referring now to FIG. 4, a flowchart depicting an exemplary method 400 is presented. The method 400 begins upon initiation of engine cranking in step 402 where the method 400 determines whether the engine coolant temperature is less than the predetermined cold start temperature. The method 400 may also determine whether the air temperature is less than the predetermined cold start temperature in step 402. If true, the method 400 continues to step 404; if false, the method 400 ends.

The method 400 determines the desired amount of fuel to be supplied to the cylinder 114 in step 404. The method 400 determines whether the desired amount of fuel is injectable in one fuel injection in step 406. In other words, the method 400 determines whether the desired amount of fuel can be injected during the intake and compression phases of a combustion cycle of the cylinder 114 (one crankshaft revolution) in step 406. If true, the method 400 ends; if false, the method 400 continues to step 408. For example only, the desired amount of fuel may be injectable in one fuel injection when the desired amount of fuel is less than the predetermined amount.

The method 400 supplies the first injection of fuel to the cylinder 114 in step 408. The method 400 may also determine how much of the desired amount of fuel should be allotted to each of the separate fuel injections in step 408. The method 400 deactivates combustion within the cylinder 114 and the intake and exhaust valves 118 and 126 in step 410.

In step 412, the method 400 supplies another (e.g., a second) injection of fuel to the cylinder 114. In implementations where the desired amount of fuel is provided in two separate injections, the second fuel injection provides the remainder of the desired amount of fuel. In other implementations, one or more additional fuel injections may also be performed before step 414. In step 414, the method 400 determines whether the desired amount of fuel has been injected. If true, the method proceeds to step 416; if false, the method returns to step 412 to supply another fuel injection. The method 400 ignites the contents of the cylinder 114 in step 416. The method 400 then ends and may enter normal engine operation.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A cylinder deactivation system comprising:
   a fuel determination module that, during engine cranking:
      determines a mass of air trapped within a cylinder of an engine based on an air temperature;
      determines a desired amount of fuel for injection into said cylinder based on the mass of air trapped within the cylinder; and,
      when said engine was shut down for greater than a predetermined period prior to said engine cranking, determines said desired amount of fuel further based on an engine coolant temperature;
   a fuel injection module that injects said desired amount of fuel into said cylinder during engine cranking;
   a cold start control module that, when said desired amount of fuel is greater than a maximum amount of fuel that a fuel pump is capable of supplying during one crankshaft revolution and at least one of said air temperature and said engine coolant temperature is less than a predetermined cold start temperature, maintains an intake valve and an exhaust valve associated with said cylinder in respective closed positions while said desired amount of fuel is injected; and
   an enabling/disabling module that disables the cold start control module when at least one of (i) said desired amount of fuel is less than said maximum amount of fuel that said fuel pump is capable of supplying during one crankshaft revolution and (ii) at least one of said air temperature and said engine coolant temperature is greater than said predetermined cold start temperature.

2. The cylinder deactivation system of claim 1 wherein said predetermined cold start temperature is less than zero degrees Celsius.

3. The cylinder deactivation system of claim 1 wherein said fuel determination module determines said desired amount of fuel further based on a type of said fuel.

4. The cylinder deactivation system of claim 1 wherein said cold start control module separates said injection of said desired amount of fuel into at least two separate fuel injection events.

5. The cylinder deactivation system of claim 1 wherein said cold start control module maintains intake and exhaust valves associated with other cylinders of said engine in closed positions, respectively, while desired amounts of fuel are injected into said other cylinders, respectively.

6. The cylinder deactivation system of claim 1 wherein said cold start control module disables opening of said intake and exhaust valves for at least two crankshaft revolutions while said desired amount of fuel is injected.

7. The cylinder deactivation system of claim 1 wherein said cold start control module disables provision of spark to said cylinder for at least two crankshaft revolutions.

8. A cylinder deactivation method comprising:
   during engine cranking:
      determining a mass of air trapped within a cylinder of an engine based on an air temperature;
      determining a desired amount of fuel for injection into said cylinder based on the mass of air trapped within the cylinder; and,
      when said engine was shut down for greater than a predetermined period prior to said engine cranking, determining said desired amount of fuel further based on an engine coolant temperature;
   injecting said desired amount of fuel into said cylinder during engine cranking;
   when said desired amount of fuel is greater than a maximum amount of fuel that a fuel pump is capable of supplying during one crankshaft revolution and at least one of said air temperature and said engine coolant temperature is less than a predetermined cold start temperature, maintaining an intake valve and an exhaust valve associated with said cylinder in respective closed positions while said desired amount of fuel is injected; and preventing said maintaining of said intake valve and said exhaust valve associated with said cylinder in respective closed positions while said desired amount of fuel is injected when at least one of (i) said desired amount of fuel is less than said maximum amount of fuel that said fuel pump is capable of supplying during one crankshaft revolution and (ii) at least one of said air temperature and said engine coolant temperature is greater than said predetermined cold start temperature.

9. The cylinder deactivation method of claim 8 wherein said predetermined cold start temperature is less than zero degrees Celsius.

10. The cylinder deactivation method of claim 8 further comprising separating said injecting said desired amount of fuel into at least two separate fuel injection events.

11. The cylinder deactivation method of claim 8 further comprising maintaining intake and exhaust valves associated with other cylinders of said engine in closed positions, respectively, while desired amounts of fuel are injected into said other cylinders, respectively.

12. The cylinder deactivation method of claim 8 further comprising disabling opening of said intake and exhaust valves for at least two crankshaft revolutions while said desired amount of fuel is injected.

13. The cylinder deactivation method of claim 8 further comprising disabling provision of spark to said cylinder for at least two crankshaft revolutions.

* * * * *